Fig. 11

June 21, 1966    C. E. CLIFFORD ET AL    3,257,285
NUCLEAR POWER REACTOR HAVING A HIGH, PROMPT NEGATIVE
TEMPERATURE COEFFICIENT OF REACTIVITY
Filed Feb. 18, 1963    7 Sheets-Sheet 6

Inventors:
Charles E. Clifford,
George R. Hopkins and Gordon B. West

_United States Patent Office_  3,257,285
Patented June 21, 1966

3,257,285
NUCLEAR POWER REACTOR HAVING A HIGH, PROMPT NEGATIVE TEMPERATURE COEFFICIENT OF REACTIVITY
Charles E. Clifford, Concord, Tenn., and George R. Hopkins and Gordon B. West, San Diego, Calif., assignors to General Dynamics Corporation, New York, N.Y., a corporation of Delaware
Filed Feb. 18, 1963, Ser. No. 259,340
12 Claims. (Cl. 176—33)

The present invention relates to nuclear reactors and more particularly to a nuclear reactor having a prompt, negative temperature coefficient of reactivity which is particularly adapted to produce power.

A nuclear reactor generally includes a reactive core which contains a moderator, some form of fuel which contains or is formed of fissionable material, and control elements. A reflector is disposed about the core to conserve escaping neutrons, and suitable radiation shielding is provided about the core and reflector. Some provision is also made in the reactor for heat removal.

When the reactor is constructed, sufficient reactivity is incorporated in the reactor to compensate for fuel burn-up and cumulative fission product poisoning. Normally, this excess reactivity is inserted gradually into the reactor as the fuel burns up and as the fission product poisoning accumulates. The insertion of the excess reactivity is normally controlled by the manipulation of control rods disposed in the reactor core. If all the available excess reactivity is inserted into the reactor, an accident could and probably would result, which accident would damage the reactor and endanger nearby personnel.

In recent years a reactor has been developed which is completely and inherently safe. This reactor, which is known by the trademark "Triga," is not only a technical achievement, but also has facilitated the training of scientists and engineers and has increased confidence in the safety of nuclear reactors to such a degree that progress in the field has been greatly accelerated. The Triga reactor has been built in locations of high population density and is being employed for training, the production of radioisotopes and research, and is especially suitable for colleges, industrial laboratories and medical centers.

A recently developed Triga reactor has been specifically designed for pulsing applications. This reactor is controlled to provide instantaneous pulses of intense neutrons and gamma radiation at repeated intervals, with peak pulsing levels of 1,200,000 kw., and minimum pulse widths at half maximum of $13/1000$ of a second.

The Triga is considered to be safe because it is safe in performance and safe in operation. A reactor is said to have safety of performance if no appreciable danger of accident exists when it is functioning under steady state conditions at its normal power level. No appreciable danger of accident will exist if the fuel is inert chemically when in contact with the coolant, if the coolant normally develops a minimum of radioactivity so that contamination by fission products can be detected at an early stage, and if the fuel is in solid form so that fission products remain contained within the fuel elements. The Triga meets all these requirements.

A reactor is said to possess operational safety if the reactor controls can be mishandled without causing an accident. To be completely safe such reactors must be designed so that all the available excess reactivity in the reactor can be instantaneously introduced without causing an accident. Such a reactor must be capable of responding correctively to a power surge within a few milliseconds from the time the surge starts. Clearly, it is not desirable to rely for ultimate safety on the rapid insertion of safety rods which must be accelerated into the reactor from a rest position, nor does it seem desirable to rely on an electronic signal from a radiation monitor to actuate the insertion.

The Triga reactor is designed to eliminate the electronic step. This is accomplished by making the Triga reactor inherently safe, i.e., an increase in the temperature of the fuel in the reactor directly and automatically results in reduced reactivity. In other words, the Triga reactor is designed with a large prompt, negative temperature coefficient.

To provide this large prompt, negative temperature coefficient, the fuel elements of the Triga reactor are disposed in spaced relation in a water bath and each element includes a solid homogeneous mixture of enriched uranium and zirconium hydride. When the fuel elements are heated by a surge in reactor power, the zirconium hydride moderator, since it is intimately mixed with the fuel, heats instantaneously with the fuel, thereby increasing the temperature of the hydrogen atoms therein. The neutrons, as a result of their collisions with the hydrogen atoms, no longer moderate to as low a velocity as they did before the surge. The average thermal neutron velocity is thereby increased, and hence more neutrons leak out of the system. Also more neutrons are captured in the water since the water does not heat up during a temperature surge. Thus, the relative absorption in the water increases. This "warm neutron effect" is a major contribution to the prompt temperature coefficient.

Present Triga reactors have been employed to produce a relatively low steady state power (i.e. about 10 kw.) which is adequate for training and research applications. The present Triga reactors have not been employed for higher power applications.

An object of the present invention is the provision of a reactor which is particularly designed for power application and in which all the available excess reactivity may be inserted at any time in the core life without damaging the reactor and without release of fission products from the reactor fuel elements. Another object of the invention is the provision of fuel elements for such a reactor. Still another object is the provision of an inherently safe compact power reactor and fuel elements therefor. A further object is the provision of a compact, pressurized water-cooled power reactor which is inherently safe. Still a further object is the provision of an inherently safe, reliable, and compact nuclear reactor which has a long life and provides low cost power. Yet a further object is the provision of a compact nuclear power reactor which is capable of adaptation to remote, mobile or unattended operation.

Other objects and advantages of the present invention will become apparent by reference to the following description and accompanying drawings.

In the drawings:

FIGURE 4 is a fragmentary, horizontal cross sectional view taken generally along line 4—4 of FIGURE 3, with portions broken away to better illustrate the construction of the fuel modules;

Generally, the nuclear reactor shown in the drawings includes a pressure vessel 10 which is supported at the bottom of a water-filled shield tank 11. A reactive core assembly 12 is supported within the pressure vessel 10, which reactive core assembly includes a plurality of vertically extending, elongated fuel elements 13. A generally annular reflector 15 is disposed between the core 12 and the pressure vessel 10. The reflector 15 is divided into segments which are moved radially relative to the core 12 by control drive mechanisms 16 to control the reactivity of the core. Means 17 are provided for defining a generally vertically extending annular coolant channel within the core 12. A generally vertically extending cylindrical shroud 18 is provided between the core 12 and the reflector 15. The upper end of the annular channel 17 is connected in fluid communication with a region between the pressure vessel 10 and the shroud 18. A liquid, such as water, or an organic coolant (e.g. diphenyl, terphenyl or mixtures of the two) which acts both as a coolant and as a moderator, is circulated through an inlet 20 provided in the pressure vessel 10, downwardly through the region defined between the shroud 18 and the pressure vessel 10 and through the channel 17, thence upwardly through the fuel elements 13, and then outwardly of an outlet 21 which is provided in the pressure vessel 10 and communicates with the shroud 18.

Figure 1:
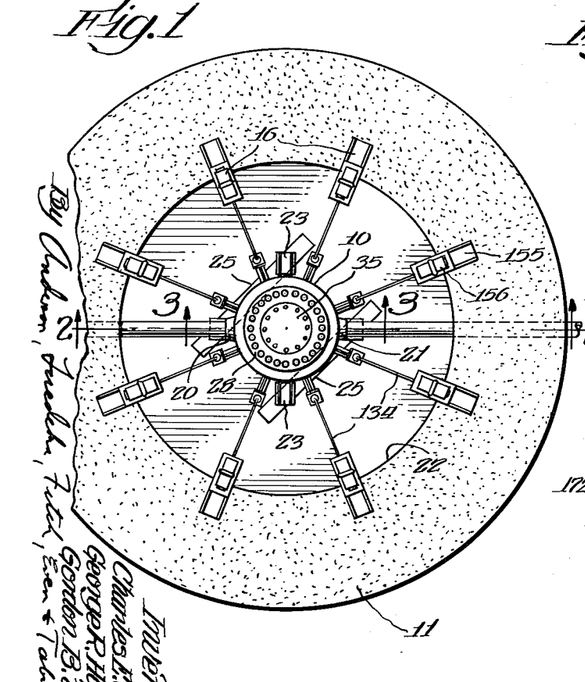
FIGURE 1 is a plan view of a nuclear reactor showing certain features of the present invention, the nuclear reactor being disposed in the lower portion of a shield tank.
Figure 2:
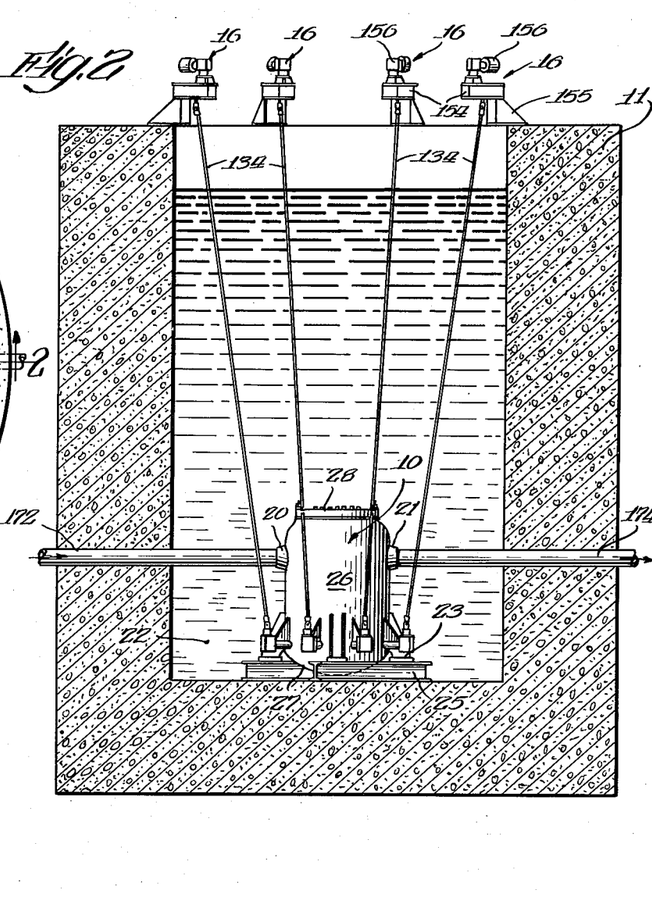
FIGURE 2 is a vertical cross sectional view taken generally along line 2—2 of FIGURE 1.

More specifically, the shield tank 11 shown in FIGURES 1 and 2 defines a generally cylindrical pit 22 for receiving the pressure vessel 10. The walls of the shield tank 11 are made of a suitable radiation shielding material, such as concrete. The pit 22 is filled with a liquid, such as water, which serves as a radiation shield and coolant. The water is circulated, cooled and demineralized by suitable means (not shown). The depth of the pit 22 is controlled by the amount of shielding desired above the pressure vessel 10 within the pit 22. The width of the pit 22 is controlled by the amount of shielding required to reduce the neutron activity to a desired value at the boundary of the pit 22.

The pressure vessel 10 is supported on the bottom of the pit 22 by four legs 23 which are connected to the pressure vessel 10 and extend outwardly therefrom. The legs 23 are mounted on a pair of parallel I-beams 25 which rest on the bottom of the pit 22. In this way, the bottom of the pressure vessel 10 is spaced from the bottom of the pit 22 to thereby allow water to freely circulate beneath the vessel 10.

Figure 3:
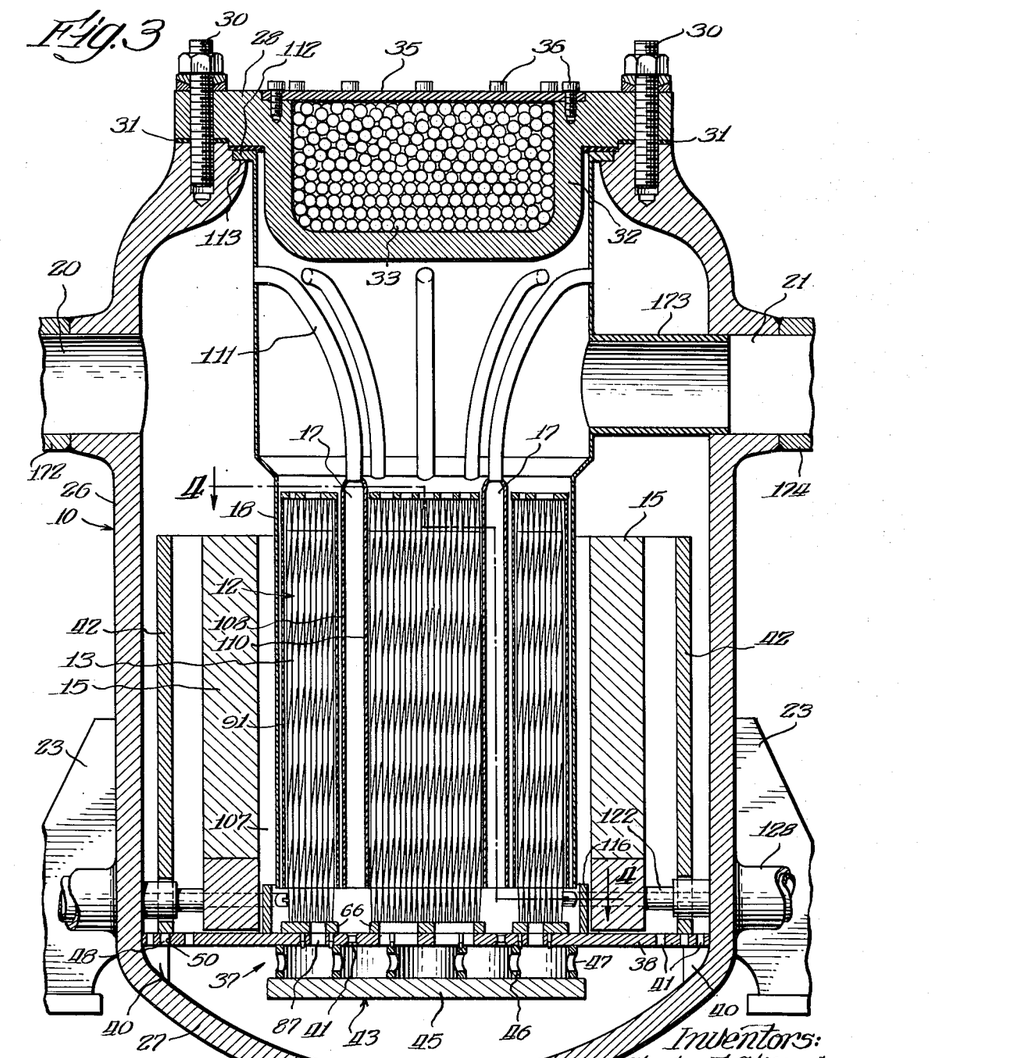
FIGURE 3 is an enlarged vertical cross sectional view taken generally along line 3—3 of FIGURE 1.

As shown particularly in FIGURE 3, the pressure vessel 10, which is made of a material having a high resistance to high energy neutron embrittlement, such as stainless steel, includes a generally tubular side wall 26, and an eliptical bottom head 27 integrally formed with the side wall 26. The upper portion of the side wall 26 is necked down to reduce pressure loading on a generally flat top head or cover 28, which is removably fastened to the necked down region of the side wall 26, as by bolts 30. A suitable gasket 31 is provided between the necked down region and the top head 28 to provide a liquid-tight joint therebetween.

The central portion of the top head 28 is provided with a downwardly extending hollow projection 32 in order to minimize the amount of coolant in the pressure vessel 10. The projection 32 may be filled with a shielding material 33, such as lead, etc., to reduce radiation streaming upwardly from the core 12 in the pressure vessel 10. A cover 35 for the hollow projection is removably fastened to the top head, as by bolts 36.

To minimize stresses the pressure vessel 10 and the top head 28 may be hermetically insulated by a water tight jacket (not shown) which encompasses the pressure vessel 10. Thermal insulating material (not shown) such as glass wool is disposed between the jacket and the pressure vessel.

As particularly shown in FIGURE 3, the core assembly 12, described hereinafter, is supported centrally within the lower portion of the pressure vessel 10 by a core support assembly 37. The core support assembly 37 includes a horizontally extending circular plate 38 of a suitable material, such as stainless steel, which rests on a plurality of blocks 40 disposed in circumferentially spaced relation along the edge portion of the bottom head 27. The blocks 40 are suitably joined to the pressure vessel 10, as by welding. The support plate 38 is provided with a plurality of apertures 41 adjacent the periphery thereof and beneath the channel defining means 17 to permit coolant to flow therethrough into the lower portion of the pressure vessel 10.

In order to minimize thermal stresses in the pressure vessel 10, thermal shields 42 and 43 of suitable material, such as stainless steel, are provided between the core assembly and the pressure vessel. As shown particularly in FIGURE 3, one of the thermal shields 43 is disposed directly below the core assembly 12. This shield includes a horizontally extending, generally circular plate 45 which is suitably carried by the core support plate 38 in spaced relation thereto as by means of concentric rings 46 welded to the support plate and to the support plate 45. The rings 46 are provided with a plurality of apertures 47 to provide passage of coolant therethrough.

The other thermal shield 42 is provided between the core assembly 12 and the side wall 26 of the pressure vessel 10. As shown in FIGURE 3, this thermal shield 42 is generally tubular in shape and is disposed adjacent the side wall 26 of the pressure vessel in spaced relation thereto. The tubular thermal shield 42 rests on the support plate 38 and the positioning thereof may be determined by a plurality of guide pins 48 depending from the lower edge of the shield 42, which pins are received in corresponding guide pin holes 50 in the core support plate 38. Spacers (not shown) are provided at the upper end of the shield 42 to space the shield 42 from the side wall 26 of the pressure vessel 10. To facilitate removal of the shield 42, the shield 42 is sectioned.

As shown in FIGURES 3 and 4, the core assembly 12 includes a plurality of fuel modules 51 which rest on the core support plate 38. The fuel modules 51 are each formed of a plurality of elongated vertically extending elements 13 which are supported in three different configurations. As shown particularly in FIGURE 4, a single generally cylindrical fuel module 51a is disposed in the central part of the core assembly (i.e., the part of the core enclosed by the channel defining means 17). Six generally triangular fuel modules 51b and six generally square fuel modules 51c are alternately disposed around the annular space defined between the annular channel 17 and the reflectors 15.

As shown in FIGURES 10 to 13 each of the fuel elements 13 includes a generally elongated tube 52 of a material which will withstand high temperatures and which has a high resistance to high energy neutron embrittlement, such as stainless steel. The tube 52 of each fuel element 13 is provided with a spiral rib 53 which serves both as a means for spacing the fuel elements 13 in the module and also as a coolant guide vane which causes a rotational component of coolant velocity. The rotating coolant increase the heat transfer characteristics of the fuel element. The tube 52 is filled with fuel material 55, hereinafter described, and is closed, at its top and bottom ends by top and bottom end fixtures 56 and 57 of suitable material such as stainless steel, which are suitably joined to the tubes, as by welding. Void spaces 58 are provided in the fuel element between the fuel material and the end fixtures 56 and 57 to provide space for the accumulation of any released gases and to provide insulation for the fuel material to reduce temperature gradients along its length.

The illustrated end fixtures 56 and 57 are of different shapes, the particular shape depending upon the position and structural function of the fuel element 13 in the respective fuel modules 51. The fuel element 13 with the end fixtures 56 and 57 shown in FIGURE 13 (hereinafter referred to as the central fuel elements 13a) occupy the majority of the area of the respective fuel modules 51. For purposes of the following description, the end fixtures are indicated by the same reference numerals and a letter subscript which relates the end fixture to the particular shape of fuel element. Similar parts of the end fixtures are indicated with the same reference numeral with the letter subscript of the associated fuel element.

Figures 12, 13:
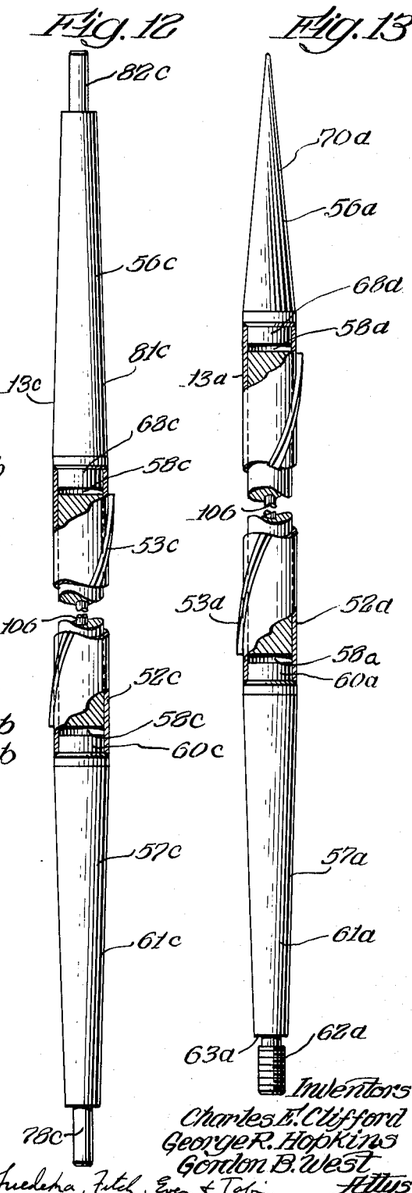

The lower end fixture 57a of the central fuel element 13a includes an upper end portion 60a which is suitably joined to the tube 52a, a central elongated downwardly tapered portion 61a, and a bottom threaded portion 62a which is reduced in diameter to provide a shoulder 63a for supporting the weight of the fuel element 13a.

Figures 8, 9:
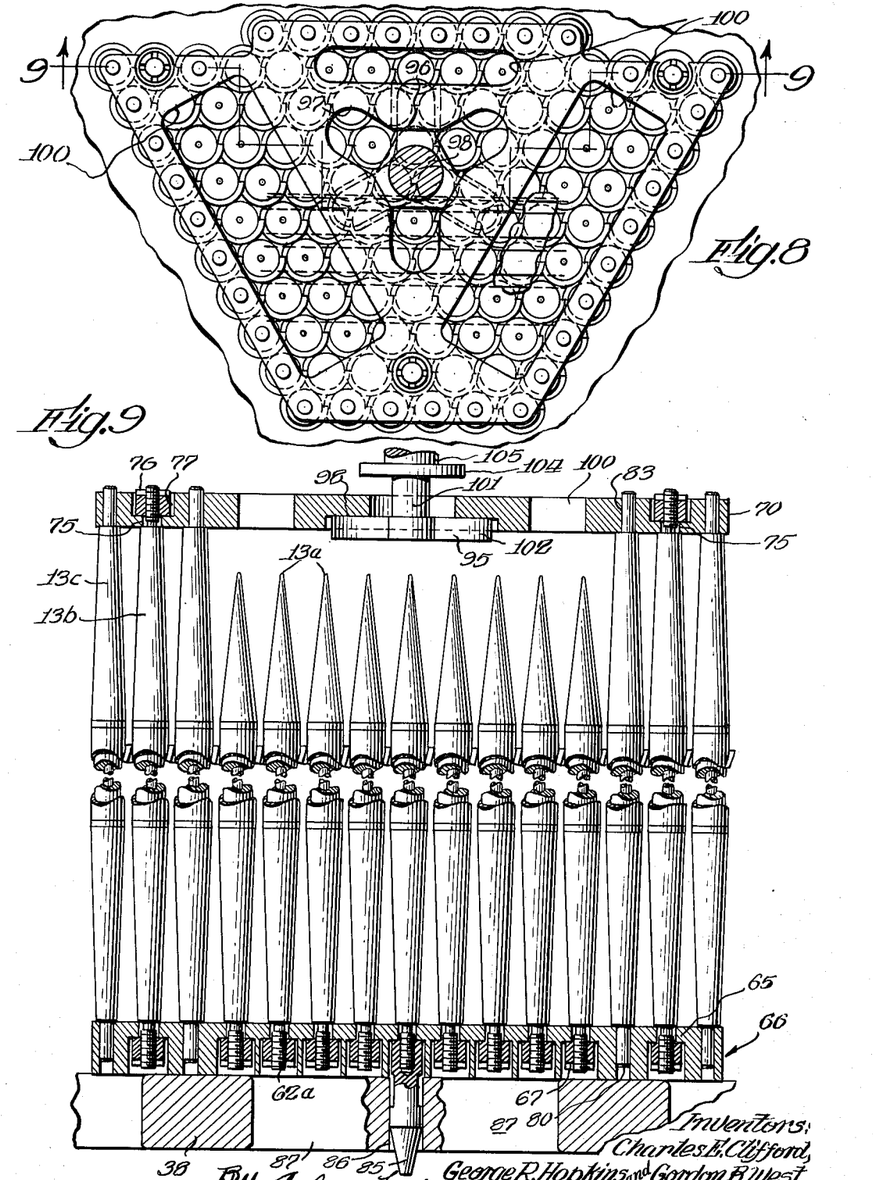
FIGURE 8 is an enlarged plan view of the fuel module shown in FIGURE 7.
FIGURE 9 is a vertical cross sectional view taken generally along line 9—9 of FIGURE 8.

As shown in FIGURE 9, the lower end portion 62a of each of the central fuel elements 13a is received in a corresponding positioning aperture 65 in a horizontally extending bottom bundle support plate 66 of suitable material, such as stainless steel. The bottom bundle support plate 66 of the cylindrical fuel module 51a is generally circular in outline (see FIGURE 4). The support plate 66 of the triangular fuel module 51b is generally trapezoidal in outline and that of the square fuel modules 51c has the outline of a segment of an annulus.

As illustrated particularly in FIGURE 9, a nut 67 is threadedly engaged on the threaded portion 62a to retain the fuel element 13a in the bottom support plate 66. The lower surface of the bottom support plate 66 is counterbored at each of the apertures 65 to receive the nut 67.

As shown in FIGURES 9 and 13, the upper end fixture 56a of each of the fuel elements 13a includes a lower portion 68a which is suitably joined to the tube 52a, and an upwardly tapered portion 70a. The upper end of the fuel element 13a is thus allowed to float freely in the fuel module 51.

Figures 10, 11:
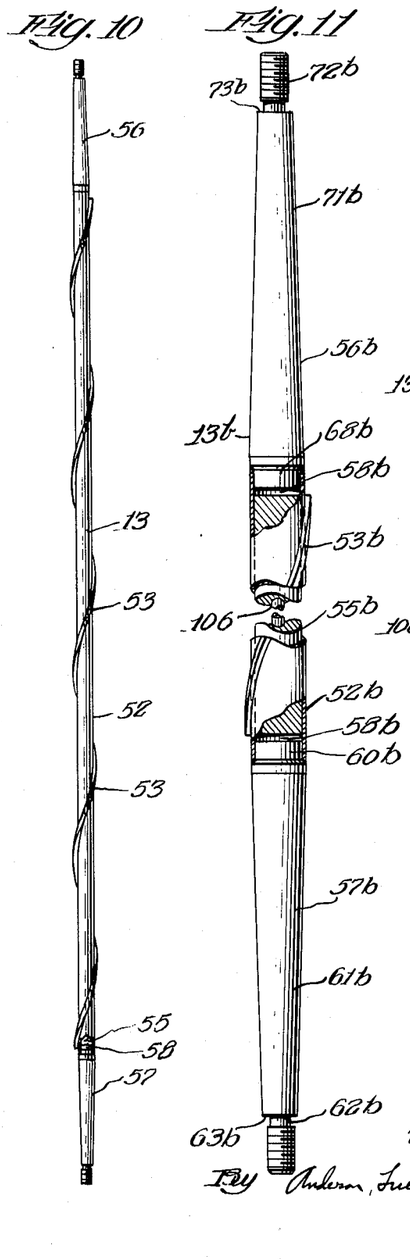
FIGURE 10 is an elevational view of one of the fuel elements shown in FIGURE 7.
FIGURES 11 to 13 are enlarged elevational views of fuel elements shown in FIGURE 7, portions thereof being broken away to show the internal construction thereof.
Figure 11:
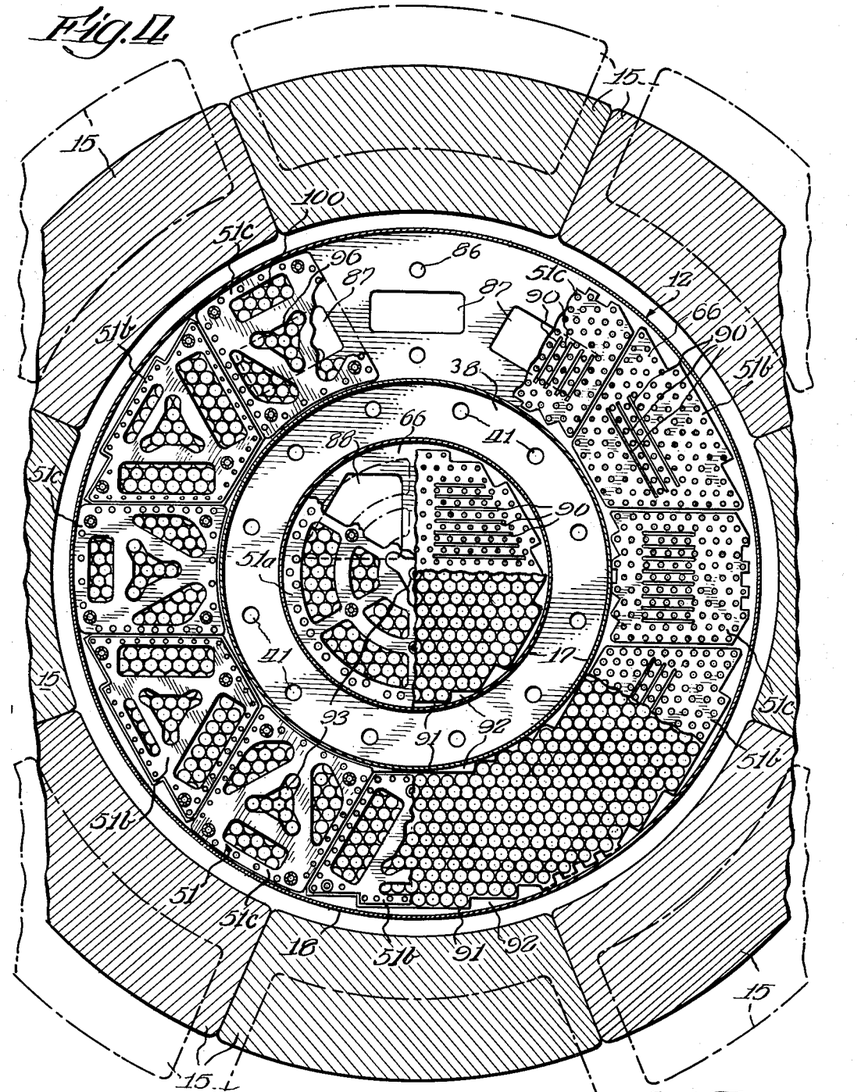

The fuel elements with the end fixtures shown in FIGURE 11 (hereinafter referred to as the fastening fuel element 13b) are disposed toward the outside of the fuel module 51 and are employed to maintain the bottom support plate 66 in a spaced relation to a top support plate 70 of the fuel module 51, which top support plate 70 is of similar shape to the bottom support plate 66.

More specifically, the lower end fixture 57b of each fastening fuel element 13b is made similar to the lower end fixture 57a of the central fuel elements 13a. The threaded portion 62b of each fastening fuel element 13b is fastened to the lower support plate 66 in a similar manner to that described above in connection with the fastening of the lower end fixture 57a of the central fuel elements 13a. The upper end fixture 56b of each fastening fuel element 13b is of similar construction to the lower end fixture 57b. In this connection, the upper end fixture 56b includes an elongated, upwardly tapered portion 71b and an upper threaded portion 72b which is reduced in diameter to provide a shoulder 73b for supporting the upper bundle support plate 70. The upper threaded portion is received within a corresponding aperture 75, in the upper support plate 70 and it is fastened to the upper support plate 70 by a nut 76 which is received in a counterbore 77 in the support plate 70 provided above the aperture 75.

As shown in FIGURE 4, the cylindrical fuel module 51a is provided with six fastening fuel elements 13b, equally spaced apart on a circle having its center corresponding to the center of the fuel module. The triangular fuel modules 51b are each provided with three of the fastening type fuel elements 13b, one being provided in each corner of the fuel module 51b. The square type fuel modules 51c are each provided with four of the fastening type fuel elements, one being provided in each of its corners.

The fuel elements with the end fixtures shown in FIGURE 12 (hereinafter referred to as perimeter fuel elements 13c) are disposed along the perimeters of each of the fuel modules and are employed to maintain the upper ends of the central fuel elements 13a in position in the respective fuel modules. In this connection, the perimeter fuel elements 13c are retained in the respective fuel modules so as to restrict the lateral movement of the perimeter fuel elements 13c but, at the same time, to allow longitudinal movement thereof. More particularly, the lower end fixture 57c of the perimeter fuel elements 13c includes an upper portion 60c which is suitably joined to the tube 52c, an elongated downwardly tapered central portion 61c and a reduced diameter, lower end portion 78c. As shown in FIGURE 9, the lower end portion 78c is received within a corresponding aperture 80 in the lower support plate 66. The upper end fixture 56c includes a lower portion 68c which is suitably joined to the top end of the tube 52c, an elongated upwardly tapered central portion 81c and an upper reduced diameter end portion 82c which is received in a corresponding aperture 83 in the upper support plate 70.

In the illustrated embodiment, the fuel modules 51 are positioned in the core assembly by a plurality of guide pins 85 which extend downwardly from the bottom support plate 66. As shown in FIGURE 9, the guide pins 85 are fastened to the threaded lower portion 62a of selected central fuel elements 13a. The guide pins 85 are received in corresponding guide pin holes 86 in the core support plate 38. The lower ends of the guide pins are chamfered to facilitate insertion of the guide pins 85 into the guide holes 86.

As shown in FIGURE 4, the core support plate 38 is provided with generally rectangular apertures 87, one under each of the triangular and square type fuel modules 51b and 51c to afford passage of water from the lower section of the pressure vessel 10 to the fuel elements 13. Four generally triangular apertures 88 are provided in the core support plate 38 under the generally cylindrical fuel module 51a for the same purpose. Water flows into the lower section through the apertures 41 provided in the support plate adjacent the tubular thermal shield and beneath the annular channel.

Elongated slots 90 are provided in the lower bundle support plates 66 to allow coolant to enter the respective fuel modules 51. These slots 90 are sized so as to control the amount of coolant flowing into the individual modules 51 from beneath the core support plate 38 and thereby afford an even distribution of flow and pressure across the fuel modules 51.

A plurality of irregular shaped, vertically extending flow separators 91 of a suitable sheet material (e.g., stainless steel), are disposed (see FIGURE 4) between the shroud 18 and the adjacent peripheral fuel elements 13 and betweeen the channel defining means 17 and the adjacent peripheral fuel elements. The separators 91 conform in shape to the peripheral fuel elements 13 and are disposed adjacent the same. The separators 91 are maintained in position by joining the same, as by welding at spaced apart locations, to the adjacent shroud 18 or channel defining means 17. These separators 91 prevent mixing of coolant flowing upwardly through the main body of the respective fuel modules 51 and that flowing upwardly through spaces 92 defined between the separators 91 and the adjacent shroud 18 or channel defining means 17. The rate of flow of the coolant in the spaces 92 is reduced by providing closure walls (not shown) in the upper ends of the spaces 92 and proper sized orifices (not shown) in the closure walls. This reduced flow velocity prevents excessive cooling of the peripheral fuel elements 13 and also acts as insulation, preventing excessive amounts of heat from being transferred between the coolant flowing upward through the fuel modules 51 and the coolant flowing downward through the channel 17 and outside the shroud 18.

Figure 7:
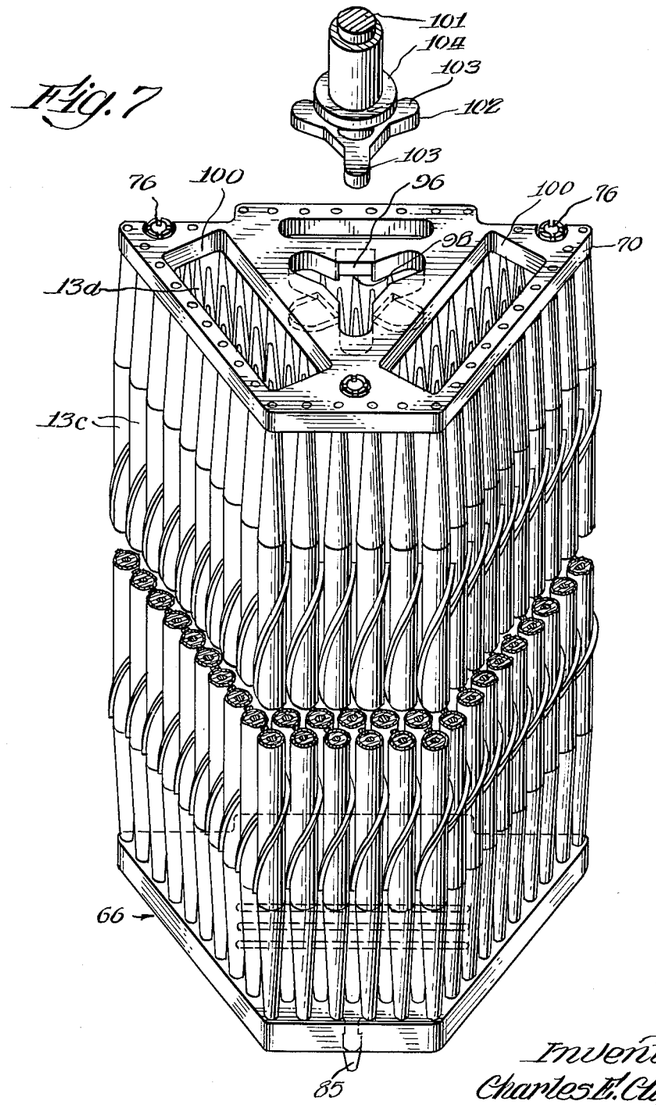
FIGURE 7 is an enlarged, perspective view of one of the fuel modules and fuel handling tools employed in the nuclear reactor shown in FIGURES 1 to 4.

As shown in FIGURES 7 to 9, an aperture 93 is provided in each top bundle support plate 70 for receiving a handling tool 95. In this connection, the aperture 93 includes a generally triangular central portion 96 and a slot 97 with a rounded end extending from each corner of the triangular portion 96. The bottom surface of the support plate 70 is provided with recesses 98 extending outwardly from the generally straight edges of the triangular central portion 96 of the aperture 93. Other apertures 100 are provided in the support plate 70 to afford passage of coolant therethrough.

The illustrated handling tool 95 includes a rod 101 having a pick-up means 102 connected to its end. The pick-up means 102 is of such a shape and size as to be received in the aperture 93. In this connection, the pick-up means 102 includes three rectangular fingers 103 which extend radially from the rod at angles of 120 degrees with respect to each other. A generally cylindrical locking ring 104 is provided on the rod 101 above the pick-up means 102. The locking ring is moved relative to the pick-up means by a tube 105 disposed about the rod 101 and joined at its lower end to the locking ring 104.

In operation, the pick-up means 102 is aligned with the aperture 93 in the support plate 70, is lowered into the aperture 93, and then the rod 101 is rotated so that the fingers 103 are received in the recesses 98 in the support plate 70. The pick-up means 95 is then locked in position by lowering the locking means 105. The fuel module 51 may then be lifted out of the core assembly 12.

In the illustrated embodiment, each of the fuel elements 13 contains a solid, homogeneous mixture of zirconium hydride and fully enriched uranium (i.e., greater than 90 percent uranium 235). Preferably the zirconium hydride composition is selected so that the fuel can withstand the relatively high temperatures which may be encountered in the power reactor. In this connection, a higher hydride composition (i.e., a composition wherein the ratio of hydrogen atoms to zirconium atoms is greater than approximately 1.5 to 1,) is selected, since such a composition is single phase (gamma) and is therefore not subject to thermal phase separation on thermal cycling. Also, the absence of a second phase in the higher hydrides eliminates the problem of large volume changes associated with phase transformations, which occur at approximately 530° C. in the lower hydride compositions. Moreover, there is an insignificant thermal diffusion of hydrogen in the higher hydride compositions and hence volume changes and cracking accompanying such diffusion are precluded. The temperature limit of a fuel element containing the higher hydride composition is thus limited only by the dynamic partial pressure of hydrogen.

Preferably, for optimum results, a composition wherein the ratio of hydrogen atoms to zirconium atoms is 1.7 to 1 is employed. The equilibrium hydrogen pressure for such a composition is about one atmosphere at 800° C. Thus, considerable latitude is permitted in variations in the fuel temperature without building up high internal gas pressures in the fuel element.

The amount of zirconium hydride and water employed in the reactor core region depends upon the size core desired and the temperature coefficient desired. For smallest critical mass, the fuel element preferably contains a major proportion of zirconium hydride and the volume of coolant is preferably ⅓. One satisfactory fuel element contains about 8 percent by weight of uranium, and the core is about ⅓ water.

Each of the fuel elements 13 also preferably contains erbium. The erbium serves as a burnable poison in the reactor and also contributes significantly to the prompt negative temperature coefficient of reactivity. In connection with the former, the erbium reduces the amount of excess reactivity available in the reactor at the beginning of the reactor life. Erbium has a cross section which is about equal to uranium 235 at about 300° C., the operating temperature of the reactor. Therefore, the rate of consumption of the erbium balances the rate of consumption of fissionable material and thereby prolongs the useful life of the fuel elements.

As previously indicated, erbium contributes to the negative temperature coefficient of reactivity. In this connection it has been found that the absorption cross section of erbium decreases slightly until the temperature of the neutrons is greater than about 200° and then the cross section of erbium rises sharply. The cross section of uranium 235, on the other hand, is approximately inversely proportional to the neutron temperature. Thus, as the temperature of the fuel element increases the proportion of neutrons absorbed in the erbium relative to the neutrons absorbed in the uranium, is increased, thereby decreasing the reactivity. Since the cross section of erbium decreases until the neutron temperature is approximately 200° C., the presence of erbium does not require large amounts of excess reactivity to be present in the reactor to raise the reactor to its operating temperature.

The erbium may be homogeneously distributed throughout the fuel material or be disposed therein in lumped form. The fuel elements 13 with homogeneously distributed erbium are employed near the shroud 18 and near the channel defining means 17, where the contribution to the temperature coefficient of reactivity is less important and where fast burnout is required to minimize reactivity swings. The fuel elements 13 with lumped erbium are employed in the major portion of the core. This configuration has been found to properly balance the fuel burnup and erbium burnout.

In the illustrated embodiment, the lumped erbium is in the form of a wire 106 (see FIGURES 11 to 13) which is incorporated in the fuel elements by drilling an axial hole through the fuel composition prior to hydriding. The erbium wire is then placed in the hole and the fuel composition is then clad in the stainless steel tube 52 and hydrided. The hydriding causes expansion of the fuel composition with a resultant close fit against the tube 52 and also against the erbium wire 106. Since the erbium cannot be removed independently of the fuel, the safety of the reactor is increased.

As the lumped erbium burns out, the temperature coefficient is influenced by two competing factors. Loss of erbium tends to decrease the prompt negative temperature coefficient, but as the lumped erbium burns out it becomes less self-shielded, and thus its effective absorption cross section increases. This tends to increase the prompt negative temperature coefficient. The interaction of these effects can be controlled to a degree by selecting the size and diameter of the erbium wire. The size and diameter of the erbium wire also controls the erbium burnup.

For certain applications, lutecium or a mixture of erbium and lutecium, may be substituted for the erbium. Lutecium has generally similar characteristics to erbium.

Generally, a reactor which has a strong, prompt negative temperature coefficient also requires a large excess reactivity to heat the reactor from room temperature to operating temperature. This large excess reactivity, which decreases until the reactor reaches its operating temperature, requires a correspondingly large amount of control to be provided in the reactor. To reduce the amount of excess reactivity which is required in the reactor to bring the reactor up to its operating temperature, the illustrated reactor is provided with means for compensating for decrease in reactivity due to the temperature rise of the coolant without sacrificing the prompt negative temperature coefficient. This is accomplished in the illustrated embodiment by providing a fuel-free region in the core which is defined by the annular coolant channel 17 in the core region and a coolant channel 107 defined between the shroud 18 and the reflector 15. Liquid coolant-moderator in these regions tends to be a poison to the overall reactivity and, hence, as the coolant temperature is increased and the density therefore decreased, the reactivity of the reactor is increased. This increase balances the reactivity loss due to the negative temperature coefficient of the reactor. In general, the thicker the channel the greater its effect on the reactivity.

As shown in FIGURE 3, the annular channel defining means 17 includes a pair of concentric, vertically extending tubular elements 108 and 110, which are joined together at their upper end. The upper end of the annular channel 17 is connected in fluid communication with the outer surface of the shroud 18 by a plurality of conduits 111. The conduits 111 also serve to support the channel so that the lower end thereof is spaced above the core support plate 38. Thus, the major portion of the coolant flowing through the annular channel 17 flows radially into the lower ends of the fuel modules 51. It should be understood that the fuel-free region need not be circular but may have other shapes, such as hexagonal, depending upon the configuration of the fuel modules.

As previously indicated, the outer coolant channel 107 is defined by the vertically extending tubular shroud 18 which encompasses the core assembly 12 and the inner face of the reflector 15. The shroud 18 is hung from the top of the pressure vessel 10. In this connection, the upper end of the shroud 18 is provided with an outwardly extending flange 112 which is received in an annular recess 113 in the necked down region of the side wall 26. The bottom edge of the core shroud is spaced from the core support plate 38 to permit coolant to flow radially thereunder into the fuel modules.

As shown in FIGURES 3 and 4, the reflector 15 which is made of a suitable moderating material, such as beryllium, is ring-shaped and is concentrically disposed about the core shroud 18 in spaced relation thereto. The reflector 15 generally extends from the top to the bottom of the body of the fuel elements 13. In the illustrated embodiment, the reflector 15 is employed to control the reactivity of the reactor. In this connection, the reflector 15 is divided into eight segments which are moved radially to vary the reactivity.

Figures 5, 6:
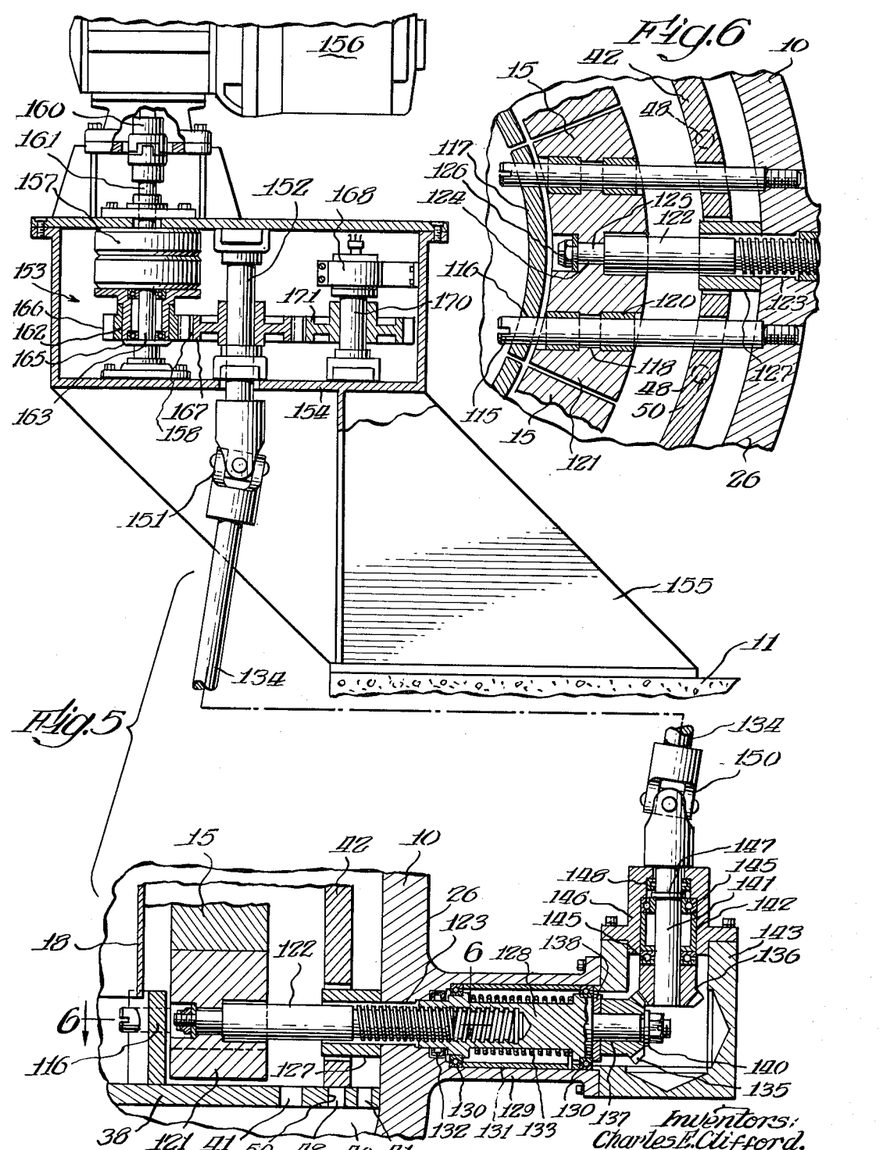
FIGURE 5 is an enlarged fragmentary, vertical cross sectional view of the control mechanism shown in FIGURES 1 to 3.
FIGURE 6 is a fragmentary, horizontal cross sectional view taken generally along line 6—6 of FIGURE 5.

As shown in FIGURES 3, 5 and 6, each of the reflector segments 15 is guided in its radial movement by a pair of rigidly mounted, spaced apart, horizontally extending guide rods 115. Each guide rod 115 is fastened by one end to the pressure vessel 10, as by threading. The other end of the rod 115 is received in a corresponding aperture 116 in an arcuate bracket 117 which is suitably joined to the core support plate 38. A pair of parallel bores with suitable bushings 120 are provided in an adapter support 121 of a suitable material, such as stainless steel which is suitably fastened to the lower end of each reflector segment 15. The bushings 120 are slidably disposed on the guide rods 115.

Each of the illustrated segments 15 is moved radially by the control drive mechanism which is best illustrated in FIGURES 5 and 6. The control drive mechanism 16 includes a horizontally extending drive shaft 122 which extends through an aperture 123 in the pressure vessel 10 and is fixedly connected at its inner end to the adapter support 121. In this connection, the end of the shaft 122 is provided with a reduced diameter end portion 124 which is received in a corresponding aperture 125 in the adapter support 121. The inner end of the drive shaft 122 is retained in the adapter support 121 by threadedly engaging the end portion 124 with a nut 126. The inner end of the aperture 125 is counterbored so that the nut 126 is recessed.

The shaft 122 is protected in its passage through the thermal shield 42 by a pipe coupling 127 suitably joined to the pressure vessel 10. The outer end portion of the shaft 122 is threaded and is engaged by an elongated cylindrical drive nut 128. The drive nut 128 is journalled in a concentrically disposed nozzle 129, which is suitably joined to the pressure vessel 10, by a pair of horizontally spaced bearings 130 disposed at either end of the drive nut 128. The bearings 130 are maintained in position on the drive nut 128 by a spacer sleeve 131 disposed concentrically within the nozzle 129. The inner end portion of the drive nut 128 is reduced in diameter, and is extended beyond the bearings 130. A liquid seal 132 is provided on the inner end portion of the drive nut 128 to prevent liquid from escaping from the pressure vessel.

In the illustrated embodiment, means 133 is provided on the drive nut 128 for biasing the same in such a direction as to move the reflector 15 to its outermost radial position. Thus, when the driving connection to the drive nut 128 is released, as hereinafter described, the refletcor 15 will be moved quickly to its outermost position, thereby quickly reducing the reactivity of the reactor. Thus, this provides a fast scram for the reactor. As shown in FIGURE 5, the biasing means is a helical spring 133 which is disposed on a reduced diameter central portion of the drive nut 128. The outer end of the spring 133 is connected to the nozzle 129 and the other end is connected to the drive nut 128.

The illustrated drive nut 128 is connected to a drive shaft 134 by means of a pair of interengaged bevel gears 135 and 136. In this connection, one of the bevel gears 135 is fixedly mounted to the drive nut 128, as by disposing the same on a reduced diameter extension 137 of the drive nut 128. The bevel gear 135 is fastened on the extension 137 by a nut 138 threadedly engaged with a threaded end portion 140 of the extension 137. A washer 140 is disposed between the bevel gear 135 and the drive nut 128 to retain the outer bearing 130 in position. The other bevel gear 136 is connected to the end of a vetrically extending shaft 141. The shaft 141 extends through an aperture in an upper wall of a housing 143 provided for the bevel gears 135 and 136, which housing 143 is suitably fastened to the nozzle 129. The shaft 141 is journalled in the housing 143 by means of a pair of bearings 145 which are maintained in vertically spaced relation by a spacer sleeve 146 disposed between the bearings 145 and in the aperture 142 in the upper wall. Downward movement of the shaft 141 relative to the bearings 145 is precluded by a collar 147 joined to the shaft 141 above the upper bearing 145. A liquid seal 148 is provided on the shaft 141 above the collar 147.

As shown in FIGURE 5, the upper end of the shaft 141 is connected through a lower universal joint 150 to the drive shaft 134 which extends upwardly to the top of the shield tank 11. The upper end of the drive shaft 134 is connected through a universal joint 151 to a vertically extending output shaft 152 of a drive and indicating device 153. The shaft 152 is journalled in a housing 154 suitably supported as by a bracket 155 on the upper edge of the shield tank 11.

The shaft 152 is rotated by a conventional gear motor 156 which is mounted to and above the housing 154 and which is connected to the drive shaft 152 by means of an electromagnetic clutch 157 and gearing 158. In this connection, a vertically extending drive shaft 160 of the gear motor 156 is coupled to the upper end of a vertically extending shaft 161 which is journalled in the housing 154. The lower end of the shaft 161 is joined to the upper half of the clutch 157. The lower half of the electromagnetic clutch 157 is joined to the upper end of a vertically extending, hollow shaft 162. The hollow shaft 162 is journalled on a vertically extending rod 163 which is disposed along the axis of the hollow shaft 162, the rod 163, in turn, being fixedly mounted in the housing 154. Downward movement of the hollow shaft 162 is precluded by a collar 165 disposed on the rod 163. The hollow shaft 162 is coupled to the output shaft 152 by the gearing 158 which includes a pair of inter-engaged spur gears 166 and 167 fastened to the hollow shaft 162 and the output shaft 152, respectively.

In the illustrated embodiment, a potentiometer 168 which is rotated by the spur gear 167 is employed to provide reflector position readout on a reactor control console (not shown). In this connection, the potentiometer 168 is fixedly mounted in the housing 154. The shaft of the potentiometer 168 is coupled to a vertically extending shaft 170 which is journalled in the housing 154. The shaft 170 is coupled to the output shaft 152 by the spur gear 167 fastened to the output shaft 152 and a spur gear 171 connected to the shaft 170.

In the illustrated embodiment, water such as that which has been passed through a steam generator (not shown) is supplied to the pressure vessel through a pipe 172 which is joined to the inlet 20 which, as shown in FIGURE 3, is a nozzle in the upper portion of the side wall 26 of the pressure vessel 10. Water enters the pressure vessel 10 and is distributed uniformly around the circumference of the pressure vesesl 10. Water then passes through four parallel annular paths, i.e., between the thermal shield 42 and the side wall 26 of the vessel 10, between the thermal shield 42 and the reflector 15, the channel 107 between the reflector 15 and the core shroud 18, and the annular channel 17 within the core 12. At the lower end of the vessel the flow combines, is reversed, and is directed upwardly through the two core regions. Above the core assembly the flow recombines and exits through a horizontally extending conduit 173 which is connected between the shroud 18 and the outlet 21 which is in the form of a nozzle suitably joined to the upper portion of the side wall 26. The outlet 21 is joined to a horizontally extending pipe 174 which is connected to the steam generator.

In certain applications, an organic liquid, such as diphenyl, terphenyl, or a mixture of the two may be substituted for the water.

In one embodiment of the reactor, the following parameters are emloyed:

| | |
|---|---|
| Reactor power [mw.(t.)] | 10 |
| Power density in fuel region (kw./liter) | 90 |
| Core length (cm.) | ~61 |
| Fuel region dimensions (cm.): | |
| Inner section O.D. | ~20.3 |
| Outer section I.D. | ~31.0 |
| Outer section O.D. | ~53.6 |
| Fuel region volume (liters): | |
| Inner section | ~19.8 |
| Outer section | ~92.1 |
| Number of fuel elements: | |
| Inner section | ~300 |
| Outer section | ~1400 |
| Water annuli dimensions (cm.): | |
| Inner annulus I.D. | ~20.6 |
| Inner annulus O.D. | ~30.7 |
| Outer annulus I.D. | ~53.9 |
| Outer annulus O.D. | ~57.7 |
| Water annuli volumes (liters): | |
| Inner annulus | ~25.1 |
| Outer annulus | ~20.3 |
| Reflector dimensions, cm.: | |
| Inner diameter | ~58.0 |
| Outer diameter | ~78.3 |
| Neutron fluxes: | |
| Average thermal flux, 0 to 1 ev. (n./cm.²/sec.) | $2 \times 10^{13}$ |
| Average fast flux, >1 ev. (n./cm.²/sec.) | $1 \times 10^{14}$ |
| Peak-to-average thermal flux ratio | 3.8 |
| Thermal disadvantage factor [$\phi$(fuel)/$\phi$(cell)] | 0.9 |
| Peak-to-average power density ratio | 1.6 |
| Initial load in core (U–235 fully enriched) kg. | ~25 |
| Amount of U–235 consumed during lifetime kg | ~4.5 |
| Core lifetime years | 1–2 |
| Reactivity changes: | |
| $\delta k/k$ (cold to hot) percent | ~0 |
| $\delta k/k$ (during life of core) percent | ±0.5 |
| Fuel temperature, average in core (° C.) | 336 |
| Water temperature in fuel region (° C.): | |
| Inlet | 280 |
| Outlet | 302 |
| Average | 291 |
| Reactivity coefficients: | |
| Fuel temperature coefficient (prompt) ($\delta k/k$ °C.) | $-8 \times 10^{-5}$ |
| Water temperature coefficient (average net for core and annulus water 25° C. to 300° C.) ($\delta k/k$ ° C.) | $+7.5 \times 10^{-5}$ |
| Void coefficient, core ($\delta k/k/\% \Delta p$) | $-7 \times 10^{-4}$ |
| Fuel element specification: | |
| Outside diameter inch | .375 |
| Length of active portion inches | 24 |
| Stainless steel cladding thickness mils | 20 |
| Zirconium hydride percent by weight | ~92 |
| Uranium percent by weight | ~8 |
| Uranium enrichment, uranium 235 percent | ~95 |
| Hydrogen atoms/zirconium atoms | 1.7 |
| Pressure vessel: | |
| Outside diameter inches | 44 |
| Thickness of shell do | 2 |
| Length feet | ~6 |
| Bottom head, elliptical | 2 to 1 |

From the above it can be seen that a nuclear reactor is provided which is compact and is inherently safe, that is, it is capable of withstanding at any time in its life, a step insertion of all available reactivity without significant damage to the core or the release of fission products. The reactor is capable of remote, mobile or unattended operation. In addition, the reactor is capable of producing low-cost power as compared to other types of reactor systems of the same power range. The reactor reduces operational costs by allowing the operation thereof with few or no personnel in attendance on a continuous basis.

Various changes and modifications may be made in the above described nuclear reactor without deviating from the spirit or scope of the present invention.

Various features of the present invention are set forth in the accompanying claims.

What is claimed is:
1. A power nuclear reactor having a high, prompt negative temperature coefficient of reactivity, comprising a pressure vessel, a quantity of water in said pressure vessel, a reactive core within the water in said vessel, said reactive core including a plurality of fluid-tight, elongated tubes, each of said tubes containing a solid homogeneous mixture of zirconium hydride and fully enriched uranium and lumped erbium in the form of a wire disposed centrally in said solid homogeneous mixture, said zirconium hydride comprising a major proportion by weight of the mixture with the ratio of hydrogen atoms to zirconium atoms being at least approximately

1.5 to 1, said tubes being spaced within said core to provide passageways surrounding each of said tubes, a fuel-free region within said core and means for causing water to flow in series through said fuel-free region and through said passageways in heat exchange relationship with said tubes.

2. A power nuclear reactor having a high, prompt negative temperature coefficient of reactivity comprising a pressure vessel, a quantity of water in said pressure vessel, a reactive core within the water in said vessel, said reactive core including a plurality of fluid-tight, elongated tubes of stainless steel, each of said tubes containing erbium and solid, homogeneous mixture of zirconium hydride and enriched uranium, said zirconium hydride comprising a major proportion by weight of the mixture with the ratio of hydrogen atoms to zirconium atoms being approximately 1.7 to 1, said tubes being spaced within the core to provide passageways surrounding each of the tubes, a fuel-free region within said core and means for causing water to flow in series through said fuel-free region and through said passageways in heat exchange relationship with said tubes.

3. A power nuclear reactor having a high prompt negative temperature coefficient of reactivity comprising a pressure vessel, a quantity of liquid which is both a moderator and coolant in said pressure vessel, a reactive core within the liquid in said vessel, said reactive core including a plurality of fluid-tight, elongated tubes, each of said tubes containing a solid, homogeneous mixture of zirconium hydride and fully enriched uranium and a material having a neutron absorption cross section which rises sharply with temperature above the operating temperature of the reactor, said zirconium hydride comprising a major proportion by weight of the mixture with the ratio of hydrogen atoms to zirconium atoms being at least approximately 1.5 to 1, said tubes being spaced within said core to provide passageways surrounding each of said tubes, a fuel-free region within said core, and means for causing the liquid to flow in series through said fuel-free region and through passageways in heat exchange relationship with said tubes.

4. A power nuclear reactor having a high, prompt negative temperature coefficient of reactivity, comprising a pressure vessel, a cylindrical reactive core within said vessel, means defining an annular passageway that is substantially free of nuclear fuel in said core, means defining a second annular passageway that is substantially free of nuclear fuel adjacent the circumference of said core, said reactive core including a plurality of fluid-tight, elongated tubes, each of said tubes containing a solid, homogeneous mixture of zirconium hydride and fully enriched uranium, said zirconium hydride comprising a major proportion by weight of the mixture with the ratio of hydrogen atoms to zirconium atoms being at least approximately 1.5 to 1, said tubes being spaced within said core to provide passageways surrounding each of said tubes, and means for causing a liquid which is both a moderator and coolant to flow downwardly through said annular passageways and upwardly through the passageways surrounding the tubes in heat exchange relationship with said tubes.

5. A power nuclear reactor having a high, prompt negative temperature coefficient of reactivity, comprising a pressure vessel, a cylindrical reactive core within said vessel, means defining an annular passageway that is substantially free of nuclear fuel in said core, means defining a second annular passageway that is substantially free of nuclear fuel adjacent the circumference of said core, said reactive core including a plurality of fluid-tight, elongated tubes, each of said tubes containing a solid homogeneous mixture of zirconium hydride, fully enriched uranium and a member selected from the group consisting of erbium, lutecium, and a mixture of lutecium and erbium, said zirconium hydride comprising a major proportion by weight of the mixture with the ratio of hydrogen atoms to zirconium atoms being at least approximately 1.5 to 1, said tubes being spaced within said core to provide passageways surrounding each of said tubes, and means for causing a liquid which is both a moderator and a coolant to flow downwardly through said annular passageways and upwardly through said passageways surrounding said tubes in heat exchange relationship with said tubes.

6. A power nuclear reactor having a high, prompt negative temperature coefficient of reactivity, comprising a pressure vessel, a cylindrical reactive core at the lower end of said vessel, means defining an annular, vertically extending passageway in said core, means defining a second annular vertically extending passageway adjacent the circumference of said core, said reactive core including a plurality of fluid-tight, elongated tubes, each of said tubes containing a solid, homogeneous mixture of zirconium hydride and fully enriched uranium, said zirconium hydride comprising a major proportion by weight of the mixture with the ratio of hydrogen atoms to zirconium atoms being at least approximately 1.5 to 1, said tubes being spaced within said core to provide passageways surrounding each of said tubes, the tubes disposed adjacent said annular passageway defining means having erbium homogeneously distributed therein, the other tubes containing lumped erbium in the form of wire extending through the center of the solid homogeneous mixture contained therein, and means for causing a liquid which is both a moderator and a coolant to flow downwardly through said annular passageways and upwardly through the passageways surrounding said tubes in heat exchange relationship with said tubes.

7. A power nuclear reactor having a high, prompt negative temperature coefficient of reactivity, comprising a pressure vessel, a reactive core within said vessel, said core including a plurality of vertically extending elongated tubes, each of said tubes containing a homogeneous mixture of a solid moderator, a material fissionable by neutrons of thermal energy and a material having a neutron absorption cross section which rises sharply with rise in temperature above the operating temperature of the reactor, an annular reflector surrounding said core, said reflector being divided into a plurality of segments, means mounting said segments for movement relative to said core between positions near said core and positions outward therefrom, means coupled to said segments for moving said segments, and means biasing said segments to said outward positions.

8. A power nuclear reactor having a high, prompt negative temperature coefficient of reactivity, comprising a pressure vessel, a cylindrical reactive core within said vessel, said core including a plurality of vertically extending elongated tubes, each of said tubes containing a homogeneous mixture of a solid moderator, a material fissionable by neutrons of thermal energy, and a material having a neutron absorption cross section which rises sharply with temperatures above the operating temperature of the reactor, an annular reflector surrounding said core, said reflector being divided into a plurality of segments, means for mounting said segments for movement radially of said core, and means coupled to each segment for moving said segment relative to said core, said moving means including a drive shaft extending through said pressure vessel and connected to said segments, the outer end of said drive shaft being provided with an external thread, a drive nut threadedly engaged with said outer end of said drive shaft, biasing means connected to said drive nut for biasing said nut in a direction such that said segment moves to its outermost position when said nut is free to rotate, a second drive shaft coupled to said nut for rotating the same, a drive motor, and an electromagnetic clutch connecting said drive motor to said drive shaft.

9. A power nuclear reactor having a high, prompt negative temperature coefficient of reactivity, comprising a pressure vessel, a generally cylindrical vertically extending core shroud in said vessel, a core support plate suitably supported above the lower end of said vessel, said support plate being provided with passageways therethrough to permit liquid to flow therethrough, said shroud extending from the upper end of said vessel to a position just above said support plate, a vertically extending annular channel disposed on said support plate within said shroud, conduits connecting the upper end of said channel to a region between the upper end of said vessel and the upper end of said shroud, means defining an inlet in said vessel adjacent said region, means defining an outlet in said vessel, a conduit connecting said outlet defining means to a region defined by the upper end of said shroud, an annular reflector disposed about said shroud in spaced relation thereto, said reflector being divided into segments, means for mounting said segments for radial movement relative to said shroud, means connected to said segments for moving said segments relative to said shroud, a plurality of vertically extending fuel elements carried by said support plate in the region defined by the lower end of said shroud, each of said fuel elements comprising a fluid-tight, elongated tube containing a solid homogeneous mixture of a moderator, a material fissionable by neutrons of thermal energy, and a member selected from the group consisting of erbium, lutecium, and a mixture of erbium and lutecium being spaced so as to provide passageways surrounding each of said fuel elements, and means for causing a liquid which is both a moderator and a coolant to flow through said inlet, downwardly along the outside of said shroud and through said channel, then upwardly through said passageways, and outwardly through said outlet.

10. In a nuclear reactor having a high, prompt negative temperature coefficient of reactivity, the improvement which comprises a cylindrical reactive core, means defining an annular passageway in said core which passageway is substantially free of nuclear fuel and which passageway divides said core into two separated reactive sections, each of said reactive core sections including a plurality of fuel elements each containing a solid mixture of nuclear fuel and a moderator which mixture has a negative temperature coefficient of reactivity, said fuel elements being spaced apart to provide passageways therebetween, and means for circulating a liquid which is both a moderator and a coolant in series flow through said annular passageway and then through said passageways between said fuel elements.

11. A nuclear reactor having a high, prompt negative temperature coefficient of reactivity, which reactor comprises a pressure vessel, a liquid which is both a coolant and a moderator disposed in said pressure vessel, a reactive core within said pressure vessel, said reactive core including a plurality of fuel elements, each of which fuel elements contains erbium and a solid homogeneous mixture of zirconium hydride and fully enriched uranium, said zirconium hydride comprising a major portion by weight of said mixture with the ratio of hydrogen atoms to zirconium atoms being at least about 1.5 to 1, said fuel elements being spaced apart from one another within said core to provide passageways surrounding each of said fuel elements, a fuel-free region within said core, and means for causing said liquid to flow in series through said fuel-free region and through said passageways in heat exchange relationship with said fuel elements.

12. A nuclear reactor having a high, prompt negative temperature coefficient of reactivity, which reactor comprises a pressure vessel, a liquid which is both a coolant and a moderator disposed in said pressure vessel, a reactive core within said pressure vessel, said reactive core including a plurality of fuel elements, each of which fuel elements contains a solid homogeneous mixture of zirconium hydride and fully enriched uranium and also contains a member selected from the group consisting of erbium, lutecium, and mixtures thereof homogeneously distributed throughout said solid homogeneous mixture, said zirconium hydride comprising a major portion by weight of said mixture with the ratio of hydrogen atoms to zirconium atoms being at least about 1.5 to 1, said fuel elements being spaced apart from one another within said core to provide passageways surrounding each of said fuel elements, a fuel-free region within said core, and means for causing said liquid to flow in series through said fuel-free region and through said passageways in heat exchange relationship with said fuel elements.

References Cited by the Examiner

UNITED STATES PATENTS

| | | | |
|---|---|---|---|
| 2,780,596 | 2/1957 | Anderson | 176—58 |
| 2,810,689 | 10/1957 | Wigner et al. | 176—62 |
| 2,852,456 | 9/1958 | Wade | 176—18 |
| 2,857,324 | 10/1958 | Boisblanc el al. | 176—61 |
| 2,999,059 | 9/1961 | Treshow | 176—20 |
| 3,019,176 | 1/1962 | Wetherbee et al. | 176—69 |
| 3,026,258 | 3/1962 | Huet | 176—29 |
| 3,072,549 | 1/1963 | Koutz et al. | 176—62 |
| 3,091,581 | 5/1963 | Barr et al. | 176—69 |
| 3,098,024 | 7/1963 | Barney et al. | 176—82 |
| 3,105,026 | 9/1963 | Dickson | 176—68 |
| 3,105,036 | 9/1963 | Puechl | 176—61 |
| 3,137,636 | 6/1964 | Wilkner. | |

FOREIGN PATENTS 818,776   8/1959   Great Britain.

OTHER REFERENCES

Volkov et al.: "Use of Burnable Poisons in Nuclear Reactors," 12 pages, April 1962 (translated from Atommaya Energiya, vol. II, No. 2, pp. 109–125, August 1961).

Lindsay: "Rare Earths as Nuclear Poisons—II," 8 pages, August 1958, technical data report of Lindsay Chemical Division, a division of American Potash & Chemical Corp., 99 Park Ave., New York 16, N.Y.

LEON D. ROSDOL, *Primary Examiner.*

REUBEN EPSTEIN, CARL D. QUARFORTH,
*Examiners.*

L. DEWAYNE RUTLEDGE, *Assistant Examiner.*